(12) United States Patent
Matsumoto

(10) Patent No.: US 11,422,307 B2
(45) Date of Patent: Aug. 23, 2022

(54) CLADDING MODE STRIPPER

(71) Applicant: FUJIKURA LTD., Tokyo (JP)

(72) Inventor: Ryokichi Matsumoto, Chiba (JP)

(73) Assignee: Fujikura Ltd., Tokyo (JP)

( * ) Notice: Subject to any disclaimer, the term of this patent is extended or adjusted under 35 U.S.C. 154(b) by 83 days.

(21) Appl. No.: 16/607,952

(22) PCT Filed: Apr. 27, 2018

(86) PCT No.: PCT/JP2018/017253
§ 371 (c)(1),
(2) Date: Oct. 24, 2019

(87) PCT Pub. No.: WO2018/199304
PCT Pub. Date: Jan. 11, 2018

(65) Prior Publication Data
US 2021/0103096 A1    Apr. 8, 2021

(30) Foreign Application Priority Data
Apr. 28, 2017 (JP) .............................. JP2017-089537

(51) Int. Cl.
*G02B 6/14* (2006.01)
(52) U.S. Cl.
CPC ...................................... *G02B 6/14* (2013.01)
(58) Field of Classification Search
CPC ..................... G02B 6/2852; G02B 6/02052
See application file for complete search history.

(56) References Cited

U.S. PATENT DOCUMENTS

| 8,885,993 | B2 | 11/2014 | Desbiens et al. |
| 2013/0087694 | A1 | 4/2013 | Creeden et al. |
| 2014/0211818 | A1* | 7/2014 | Hou ............ B23K 26/36 372/6 |
| 2015/0086160 | A1 | 3/2015 | Huber et al. |

(Continued)

FOREIGN PATENT DOCUMENTS

| CN | 102713711 A | 10/2012 |
| CN | 203574218 U | 4/2014 |
| CN | 104297841 A | 1/2015 |

(Continued)

OTHER PUBLICATIONS

International Preliminary Report on Patentability issued in corresponding International Patent Application No. PCT/JP2018/017253, dated Nov. 7, 2019 (12 pages).

(Continued)

*Primary Examiner* — Eric Wong
(74) *Attorney, Agent, or Firm* — Osha Bergman Watanabe & Burton LLP

(57) ABSTRACT

A cladding mode stripper, includes: a resin part that covers a coating-removed section of an optical fiber and has a refractive index not less than that of an outermost shell of the optical fiber in the coating-removed section. A surface of the resin part includes an incident angle reducing structure. The surface is opposite to an interface between the resin part and the outermost shell. The incident angle reducing structure reduces a first incident angle or a first average incident angle at which cladding mode light that has entered the resin part from the optical fiber enters the surface.

12 Claims, 8 Drawing Sheets

(56) References Cited

U.S. PATENT DOCUMENTS

| | | | |
|---|---|---|---|
| 2016/0202419 A1* | 7/2016 | Lapointe | G02B 6/14 385/29 |
| 2018/0267233 A1* | 9/2018 | Bansal | G02B 6/03694 |

FOREIGN PATENT DOCUMENTS

| | | | |
|---|---|---|---|
| CN | 105068181 A | 11/2015 | |
| CN | 105449499 A | 3/2016 | |
| JP | H01-316705 A | 12/1989 | |
| JP | 2007-227713 A | 9/2007 | |
| JP | 2008-268747 A | 11/2008 | |
| JP | 2012-014173 A | 1/2012 | |
| JP | 2014-126687 A | 7/2014 | |
| JP | 2014-163955 A | 9/2014 | |
| WO | WO-2005002005 A2 * | 1/2005 | G02B 6/4214 |
| WO | 2012088267 A3 | 6/2012 | |
| WO | 2013/001734 A1 | 1/2013 | |

OTHER PUBLICATIONS

International Search Report issued in International Application No. PCT/JP2018/017253, dated Jul. 3, 2018 (4 pages).

* cited by examiner

PRIOR ART

CLADDING MODE STRIPPER

TECHNICAL FIELD

The present invention relates to a cladding mode stripper for removing cladding mode light from an optical fiber.

BACKGROUND

In the field of material processing in which metal materials or the like are processed (e.g., cut, welded, shaved), laser processing using laser light has been increasingly used, replacing machining using a blade, a drill, or the like. As a laser device for use in laser processing, a fiber laser has been attracting attention. For processing that requires laser light with higher power, a fiber laser system including a plurality of fiber lasers and a combiner for combining laser light waves generated by the respective plurality of fiber lasers is used.

The fiber laser is a laser device including, as a resonator, a pump-gain fiber that has fiber Bragg gratings connected to the opposite ends thereof, wherein one of the fiber Bragg gratings serves as a mirror and the other serves as a half mirror. The pump-gain fiber is typically a double cladding fiber whose core is doped with a rare-earth element such as Yb. Signal light generated by the resonator is guided to an object to be processed, with use of a delivery fiber connected to the fiber Bragg grating serving as the half mirror. The delivery fiber is typically a double cladding fiber as well.

In the fiber laser, an optical path of laser light generated by the resonator is constituted by the pump-gain fiber, the fiber Bragg grating, and the delivery fiber. The optical path includes at least a connection point between the pump-gain fiber and the fiber Bragg grating and a connection point between the fiber Bragg grating and the delivery fiber. At any of the connection points constituting the optical path, in a case where the optical fibers at the connection point have mismatch of cores (difference in core diameter, axial misalignment between the cores, or the like), cladding mode light is excited in a cladding of a downstream one of the optical fibers. For example, in a case where cores mismatch at the connection point between the fiber Bragg grating and the delivery fiber, cladding mode light is excited in a cladding of the delivery fiber. Further, also in a case where a disturbance such as lateral pressure or bending is applied to an optical fiber constituting the optical path, a higher order mode component of laser light guided through the core leaks into a cladding, so that cladding mode light is excited. In the fiber laser system, the combiner can be a source of cladding mode light, and a connection point between the combiner and an optical fiber constituting the optical path can also be a source of cladding mode light.

Cladding mode light which is guided through a cladding of an optical fiber constituting the optical path (i) causes a coating of the optical fiber or of an optical fiber downstream of the optical fiber to generate heat and (ii) causes a component of a processing head connected to an exit end of the delivery fiber to generate heat. That is, cladding mode light guided through a cladding of an optical fiber constituting the optical path can cause a decrease in reliability of the fiber laser or the fiber laser system. In view of this, an optical fiber constituting the optical path is provided with a cladding mode stripper for removing cladding mode light.

FIG. 13 is a longitudinal sectional view illustrating a configuration of a conventional cladding mode stripper 10. The cladding mode stripper 10 is constituted by a high-refractive-index resin part 101 which covers a portion of an inner cladding 52 of an optical fiber 5 which portion is exposed in a coating-removed section I. The high-refractive-index resin part 101 is made of a light-transmitting resin having a refractive index not less than that of the inner cladding 52 of the optical fiber 5. This allows cladding mode light confined in the inner cladding 52 of the optical fiber 5 to leak into the high-refractive-index resin part 101 in the coating-removed section I.

Patent Literature 1 discloses a cladding mode stripper provided with a heat dissipation mechanism or a cooling mechanism. Patent Literature 2 discloses a cladding mode stripper including a high-refractive-index resin part having a refractive index that gradually increases along a light propagation direction.

Patent Literature 1

Japanese Patent Application Publication, Tokukaihei, No. 1-316705

Patent Literature 2

International Publication No. WO 2013/001734

In a conventional cladding mode stripper, part of cladding mode light which part has leaked out from an optical fiber in a coating-removed section may propagate inside a high-refractive-index resin part while being repeatedly reflected by a surface of the high-refractive-index resin part. The cladding mode light propagating inside the high-refractive-index resin part may cause the high-refractive-index resin part to generate heat and may degrade the high-refractive-index resin part, accordingly.

For example, in a case where 1% of laser light guided through a core of a fiber laser having an output of 1 kW becomes cladding mode light, the cladding mode power is as high as 10 W. In a case where a 10 W cladding mode is converted into heat in a high-refractive-index resin part having a length of several millimeters to several centimeters, a temperature rise enough to degrade the high-refractive-index resin part may occur.

SUMMARY

One or more embodiments of the present invention provide a cladding mode stripper that is arranged such that heat generation of a high-refractive-index resin part is less likely to occur as compared with a conventional cladding mode stripper.

A cladding mode stripper in accordance with one or more embodiments of the present invention is a cladding mode stripper, including a resin part which covers a coating-removed section of an optical fiber and has a refractive index not less than that of an outermost shell of the optical fiber in the coating-removed section, the resin part including an incident angle reducing structure formed on a surface of the resin part, the incident angle reducing structure being for reducing an incident angle or an average incident angle at which cladding mode light that has entered the resin part from the optical fiber enters the surface.

A cladding mode stripper in accordance with one or more embodiments of the present invention is a cladding mode stripper, including: a resin part which covers a coating-removed section of an optical fiber and has a refractive index not less than that of an outermost shell of the optical fiber in the coating-removed section; and a transparent member which supports the resin part and has a refractive index matching that of the resin part, the transparent member including a rough surface in a region of a surface of the transparent member which region is opposite to an interface between the transparent member and the resin part, cladding mode light that has entered the transparent member from the optical fiber through the resin part being scattered by the rough surface so that an average propagation angle of the cladding mode light is increased.

According to an aspect of the present invention, it is possible to provide a cladding mode stripper that is arranged such that heat generation of a high-refractive-index resin part is less likely to occur as compared with a conventional cladding mode stripper.

DETAILED DESCRIPTION

Figure 1:
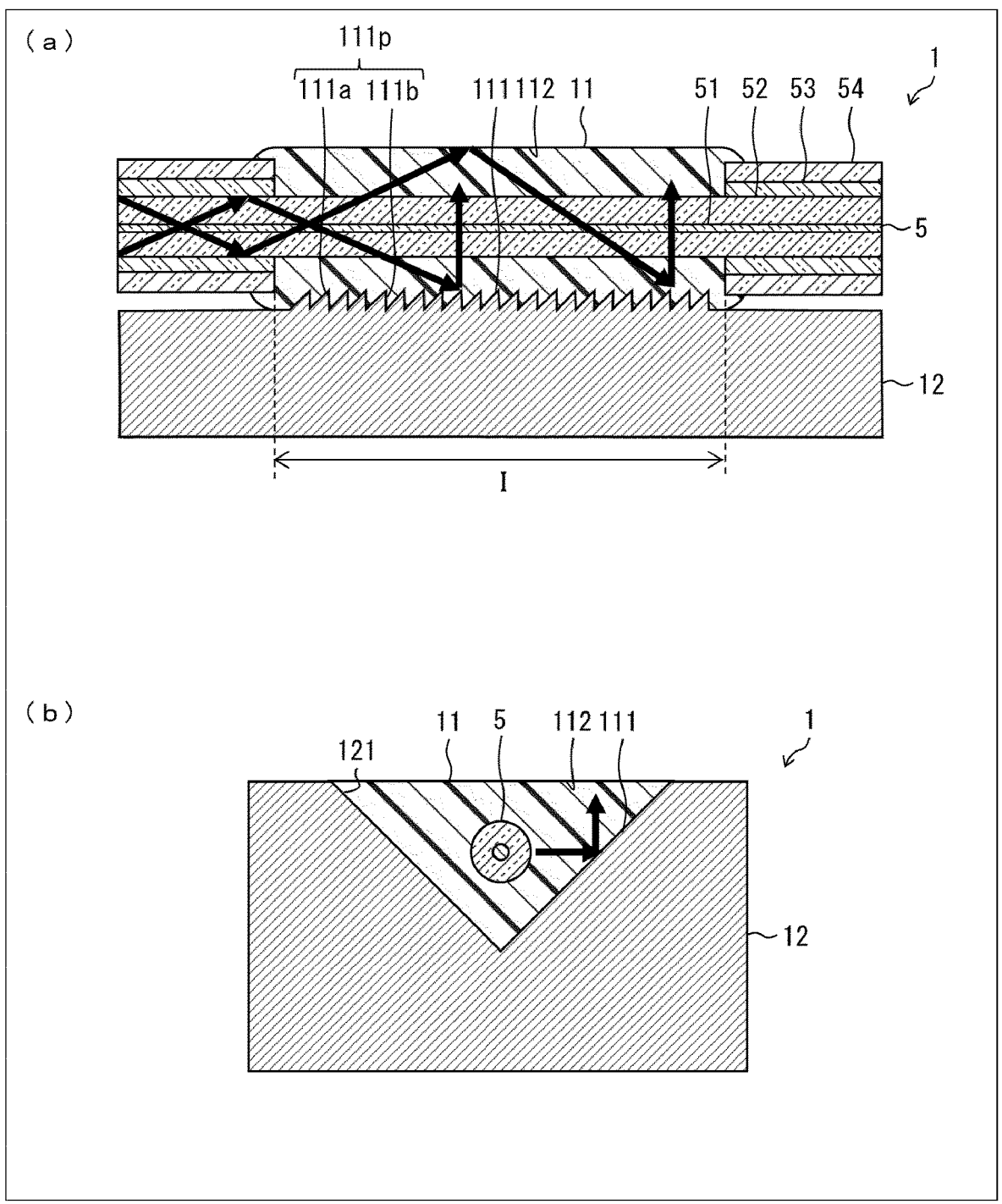
FIG. 1 is a longitudinal sectional view and a transverse sectional view each illustrating a configuration of a cladding mode stripper in accordance with one or more embodiments of the present invention.

The following description will discuss, with reference to FIG. 1, a configuration of a cladding mode stripper 1 in accordance with one or more embodiments of the present invention. (a) of FIG. 1 is a longitudinal sectional view of the cladding mode stripper 1 and (b) of FIG. 1 is a transverse sectional view of the cladding mode stripper 1.

The cladding mode stripper 1 includes (i) a high-refractive-index resin part 11 which covers a coating-removed section I of an optical fiber 5 and (ii) a reinforcement member 12 which supports the high-refractive-index resin part 11. The reinforcement member 12 is, for example, a rectangular parallelepiped member on an upper surface of which a V-shaped groove 121 is formed. The reinforcement member 12 is made of a non-transparent material (e.g., alumina). Alumina has a high thermal conductivity, a low linear expansion coefficient, and good processability, and therefore may be used as a material of the reinforcement member 12. The high-refractive-index resin part 11 is obtained, for example, by curing resin injected into the V-shaped groove 121 of the reinforcement member 12. The high-refractive-index resin part 11 is made of a light-transmitting resin having a refractive index not less than that of an outermost shell of the optical fiber 5 in the coating-removed section I.

The optical fiber 5 is made of, for example, a core 51 made of glass, an inner cladding 52 made of glass and covering a circumferential surface of the core 51, an outer cladding 53 made of a resin and covering an outer circumferential surface of the inner cladding 52, and a coating 54 made of a resin and covering an outer circumferential surface of the outer cladding 53. In the coating-removed section I, the outer cladding 53 and the coating 54 are removed so that the inner cladding 52 serves as the outermost shell. The high-refractive-index resin part 11 is made of a resin having a refractive index higher than that of the inner cladding 52 and covers the outer circumferential surface of the inner cladding 52 in the coating-removed section I.

The cladding mode stripper 1 is characterized in that a planar prism (Fresnel prism) 111p is formed on a portion of a surface of the high-refractive-index resin part 11 which portion constitutes an interface between the high-refractive-index resin part 11 and the reinforcement member 12, the planar prism 111p being constituted by inclined surfaces 111a and vertical surfaces 111b alternately arranged along an optical axis of the optical fiber 5. The inclined surfaces 111a each face a light-entrance end and make, for example, an angle of 45° with the optical axis of the optical fiber 5. The vertical surfaces 111b each face a light-exit end and make, for example, an angle of 90° with the optical axis of the optical fiber 5. Hereinafter, on the surface of the high-refractive-index resin part 11, a region constituting an interface between the high-refractive-index resin part 11 and the reinforcement member 12 is referred to as a first region 111, and a region constituting an interface between the high-refractive-index resin part 11 and the air is referred to as a second region 112. On the surface of the high-refractive-index resin part 11, a region in which the planar prism 111p is formed is included in the first region 111 and is opposite to the second region 112.

In the high-refractive-index resin part 11, cladding mode light that has entered the high-refractive-index resin part 11 from the optical fiber 5 is reflected, by the first region 111 in which the planar prism 111p is formed as described above, so that a propagation angle (an angle between an optical axis of the cladding mode light and the optical axis of the optical fiber 5 (acute angle)) of the cladding mode light is increased. As a result, in the high-refractive-index resin part 11, an incident angle (an angle between an optical axis of the cladding mode light and a normal line of the second region 112 (acute angle)) at which the cladding mode light reflected by the first region 111 enters the second region 112 is reduced as compared with a case in which no planar prism is formed in the first region 111. That is, the planar prism 111*p* formed in the first region 111 functions as an incident angle reducing structure for reducing the incident angle at which the cladding mode light enters the second region 112.

Accordingly, in the high-refractive-index resin part 11, a reflectance of the second region 112 in reflecting cladding mode light that has been reflected by the first region 111 is reduced as compared with a case in which no planar prism is formed in the first region 111. As a result, a distance by which cladding mode light propagates inside the high-refractive-index resin part 11 while being repeatedly reflected by the surface of the high-refractive-index resin part 11 is reduced as compared with a case in which no planar prism is formed in the first region 111. This enables effective prevention of heat generation and degradation of the high-refractive-index resin part 11 which are caused by cladding mode light propagating inside the high-refractive-index resin part 11.

Figure 2:
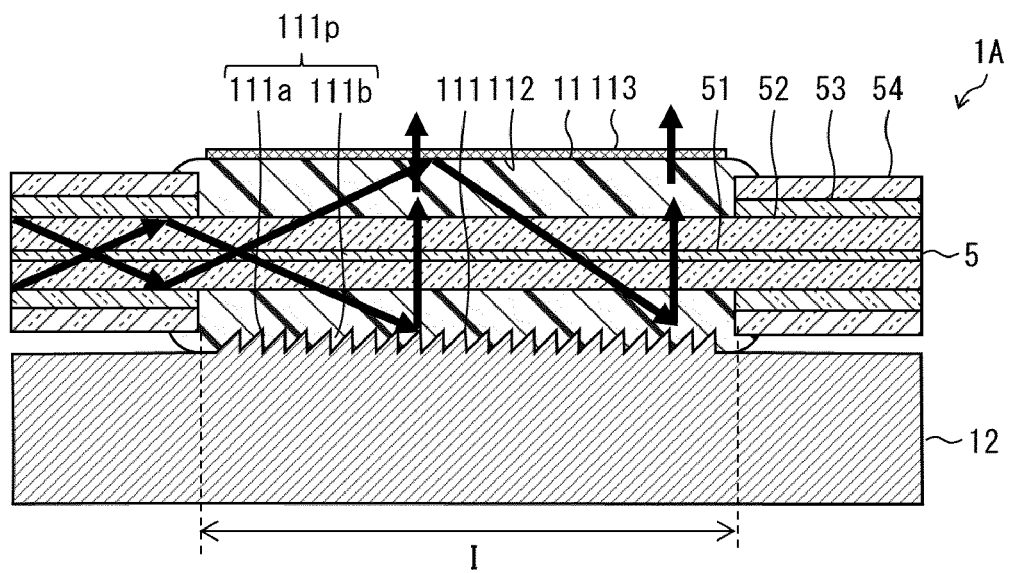
FIG. 2 is a longitudinal sectional view illustrating Modified Example 1 of the cladding mode stripper illustrated in FIG. 1.
Figure 3:
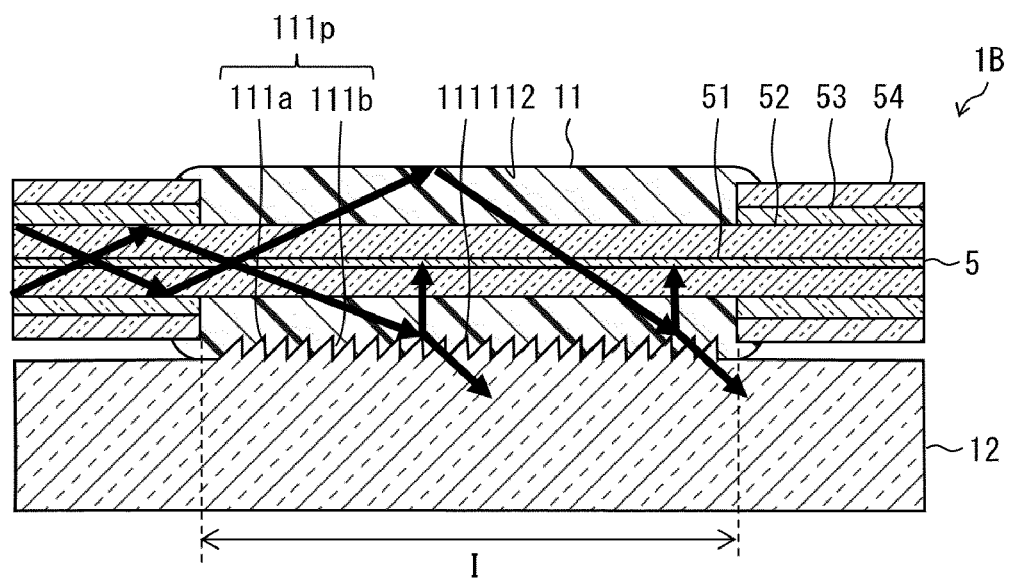
FIG. 3 is a longitudinal sectional view illustrating Modified Example 2 of the cladding mode stripper illustrated in FIG. 1.

The following description will discuss, with reference to FIGS. 2 and 3, Modified Examples of the cladding mode stripper 1 in accordance with one or more embodiments.

A cladding mode stripper 1A in accordance with Modified Example 1 will be described below with reference to FIG. 2. FIG. 2 is a longitudinal sectional view of the cladding mode stripper 1A. The cladding mode stripper 1 (see FIG. 1) and the cladding mode stripper 1A in accordance with Modified Example 1 differ from each other in the following point.

Difference: On the surface of the high-refractive-index resin part 11 of the cladding mode stripper 1, the second region 112 is exposed, whereas on a surface of a high-refractive-index resin part 11 of the cladding mode stripper 1A, the second region 112 is coated with an anti-reflection (AR) coating 113 which serves as an anti-reflection film. The AR coating 113 may be made of a material having a low refractive index and can be, for example, a fluorine-based resin, magnesium fluoride, or the like.

In the high-refractive-index resin part 11 of the cladding mode stripper 1A, the presence of the AR coating 113 with which the second region 112 is coated further reduces a reflectance of the second region 112 in reflecting cladding mode light that has been reflected by the first region 111. Further, since a planar prism is formed in the first region 111, an incident angle at which cladding mode light enters the AR coating 113 is reduced, so that an antireflection property of the AR coating 113 is exhibited more easily. As a result, a distance by which cladding mode light propagates inside the high-refractive-index resin part 11 while being repeatedly reflected by a surface of the high-refractive-index resin part 11 is further reduced. This enables even more effective prevention of heat generation and degradation of the high-refractive-index resin part 11 which are caused by cladding mode light propagating inside the high-refractive-index resin part 11.

Next, a cladding mode stripper 1B in accordance with Modified Example 2 will be described below with reference to FIG. 3. FIG. 3 is a longitudinal sectional view of the cladding mode stripper 1B. The cladding mode stripper 1 (see FIG. 1) and the cladding mode stripper 1B in accordance with Modified Example 2 differ from each other in the following point.

Difference: In the cladding mode stripper 1, the reinforcement member 12 is made of a non-transparent material (e.g., alumina), whereas in the cladding mode stripper 1B, a reinforcement member 12 is made of a transparent material (e.g., quartz or aluminum nitride).

Since the reinforcement member 12 is made of the transparent material, a reflectance of a first region 111 in reflecting cladding mode light that has entered a high-refractive-index resin part 11 is reduced due to light that enters the reinforcement member 12. For example, in a case where a refractive index difference between the high-refractive-index resin part 11 and the reinforcement member 12 is 4%, the first region 111 has a reflectance of approximately 60% in reflecting cladding mode light that propagates through the high-refractive-index resin part 11 at a propagation angle of 2° and enters the first region 111 at an incident angle of 88°. Further, since a planar prism is formed in the first region 111, an incident angle at which the cladding mode light enters the reinforcement member 12 is reduced as compared with a case in which no planar prism is formed in the first region 111. This (i) increases a proportion of cladding mode light that enters the reinforcement member 12 without being reflected by the first region 111 and (ii) reduces a proportion of light that is reflected by the first region 111 and returns to the high-refractive-index resin part 11. As a result, a distance by which cladding mode light propagates inside the high-refractive-index resin part 11 while being repeatedly reflected by a surface of the high-refractive-index resin part 11 is further reduced. This enables even more effective prevention of heat generation and degradation of the high-refractive-index resin part 11 which are caused by cladding mode light propagating inside the high-refractive-index resin part 11.

Note that an incident angle reducing structure formed on a surface of a high-refractive-index resin part may be (i) a surface structure that is formed, passively or heteronomously as a reflection of a surface shape of a reinforcement member, in a region constituting an interface between the high-refractive-index resin part and the reinforcement member or (ii) a surface structure that is formed, actively or autonomously, in a region that does not constitute an interface between the high-refractive-index resin part and the reinforcement member. The above-described embodiments are examples in which the planar prism 111*p* formed passively or heteronomously on the surface of the high-refractive-index resin part 11 is used as an incident angle reducing structure. One or more embodiments, which will be described later, are examples in which a planar prism 212*p* formed actively or autonomously on a surface of a high-refractive-index resin part 21 is used as an incident angle reducing structure (see FIG. 4). One or more embodiments, which will be described later, are examples in which a rough surface 311*q* formed passively or heteronomously on a surface of a high-refractive-index resin part 31 is used as an incident angle reducing structure (see FIG. 5).

Figure 4:
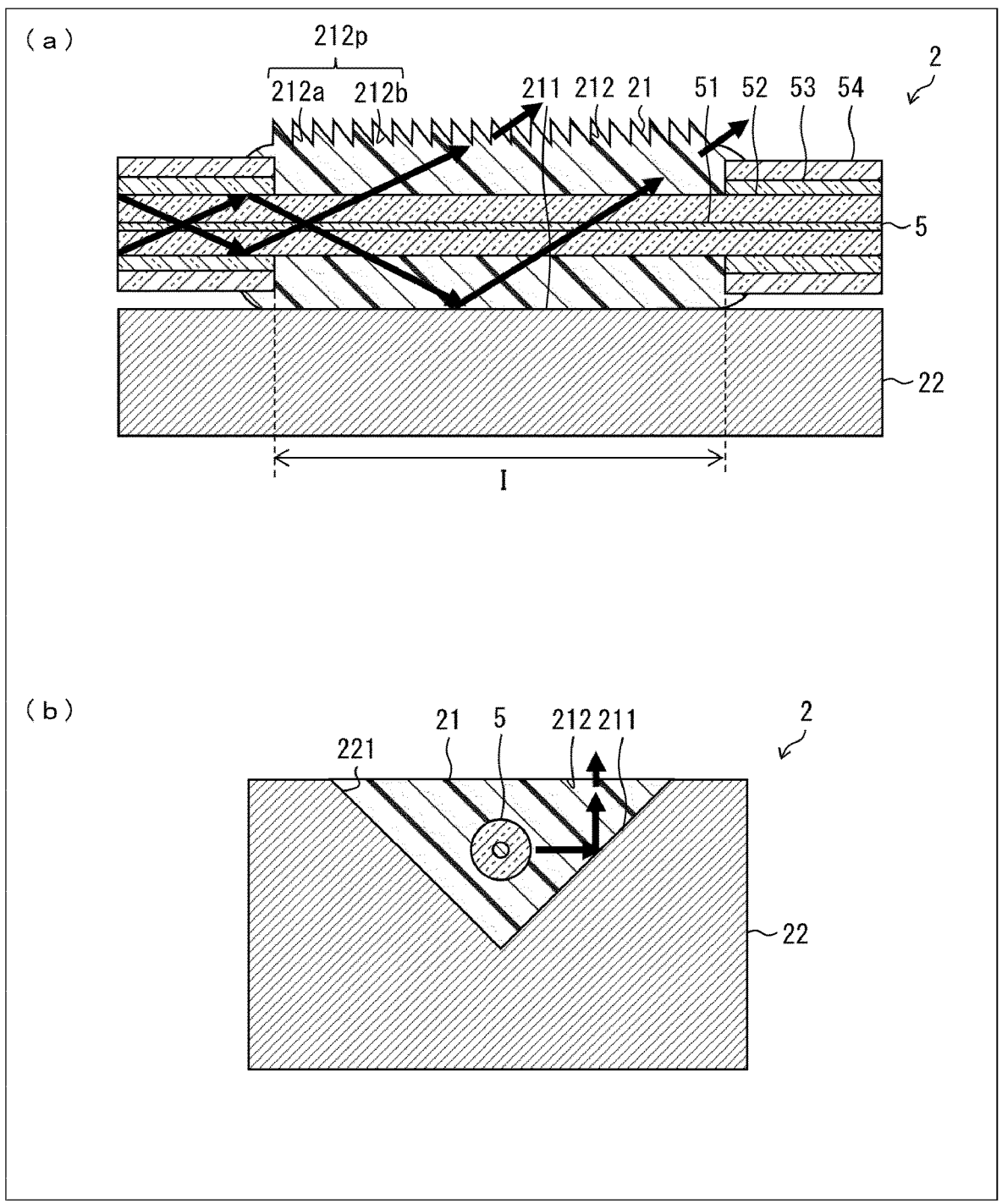
FIG. 4 is a longitudinal sectional view and a transverse sectional view each illustrating a configuration of a cladding mode stripper in accordance with one or more embodiments of the present invention.

The following description will discuss, with reference to FIG. 4, a configuration of a cladding mode stripper 2 in accordance with one or more embodiments of the present invention. (a) of FIG. 4 is a longitudinal sectional view of the cladding mode stripper 2 and (b) of FIG. 4 is a transverse sectional view of the cladding mode stripper 2.

The cladding mode stripper 2 includes (i) the high-refractive-index resin part 21 which covers a coating-removed section I of an optical fiber 5 and (ii) a reinforcement member 22 which supports the high-refractive-index resin part 21. The reinforcement member 22 is, for example, a rectangular parallelepiped member on an upper surface of which a V-shaped groove 221 is formed. The reinforcement member 22 is made of a non-transparent material (e.g., alumina). The high-refractive-index resin part 21 is obtained, for example, by curing resin injected into the V-shaped groove 221 of the reinforcement member 22. The high-refractive-index resin part 21 is made of a light-transmitting resin having a refractive index not less than that of an outermost shell of the optical fiber 5 in the coating-removed section I.

The optical fiber 5 is made of, for example, a core 51 made of glass, an inner cladding 52 made of glass and covering a circumferential surface of the core 51, an outer cladding 53 made of a resin and covering an outer circumferential surface of the inner cladding 52, and a coating 54 made of a resin and covering an outer circumferential surface of the outer cladding 53. In the coating-removed section I, the outer cladding 53 and the coating 54 are removed so that the inner cladding 52 serves as the outermost shell. The high-refractive-index resin part 21 is made of a resin having a refractive index higher than that of the inner cladding 52 and covers the outer circumferential surface of the inner cladding 52 in the coating-removed section I.

The cladding mode stripper 2 is characterized in that the planar prism (Fresnel prism) 212p is formed on a portion of a surface of the high-refractive-index resin part 21 which portion constitutes an interface between the high-refractive-index resin part 21 and the air, the planar prism 212p being constituted by vertical surfaces 212a and inclined surfaces 212b alternately arranged along an optical axis of the optical fiber 5. The vertical surfaces 212a each face a light-entrance end and make, for example, an angle of 90° with the optical axis of the optical fiber 5. The inclined surfaces 212b each face a light-exit end and make, for example, an angle of 45° with the optical axis of the optical fiber 5. Hereinafter, on the surface of the high-refractive-index resin part 21, a region constituting an interface between the high-refractive-index resin part 21 and the reinforcement member 22 is referred to as a first region 211, and a region constituting an interface between the high-refractive-index resin part 21 and the air is referred to as a second region 212. On the surface of the high-refractive-index resin part 21, a region in which the planar prism 212p is formed is included in the second region 212 and is opposite to the first region 211.

In the high-refractive-index resin part 21, the provision of the planar prism 212p in the second region 212 reduces an incident angle at which cladding mode light reflected by the first region 211 enters the second region 212. That is, the planar prism 212p formed in the second region 212 functions as an incident angle reducing structure for reducing the incident angle at which the cladding mode light enters the second region 212.

Accordingly, in the high-refractive-index resin part 21, a reflectance of the second region 212 in reflecting cladding mode light reflected by the first region 211 is reduced as compared with a case in which no planar prism is formed in the second region 212. As a result, a distance by which cladding mode light propagates inside the high-refractive-index resin part 21 while being repeatedly reflected by the surface of the high-refractive-index resin part 21 is reduced as compared with a case in which no planar prism is formed in the second region 212. This enables effective prevention of heat generation and degradation of the high-refractive-index resin part 21 which are caused by cladding mode light propagating inside the high-refractive-index resin part 21.

Figure 5:
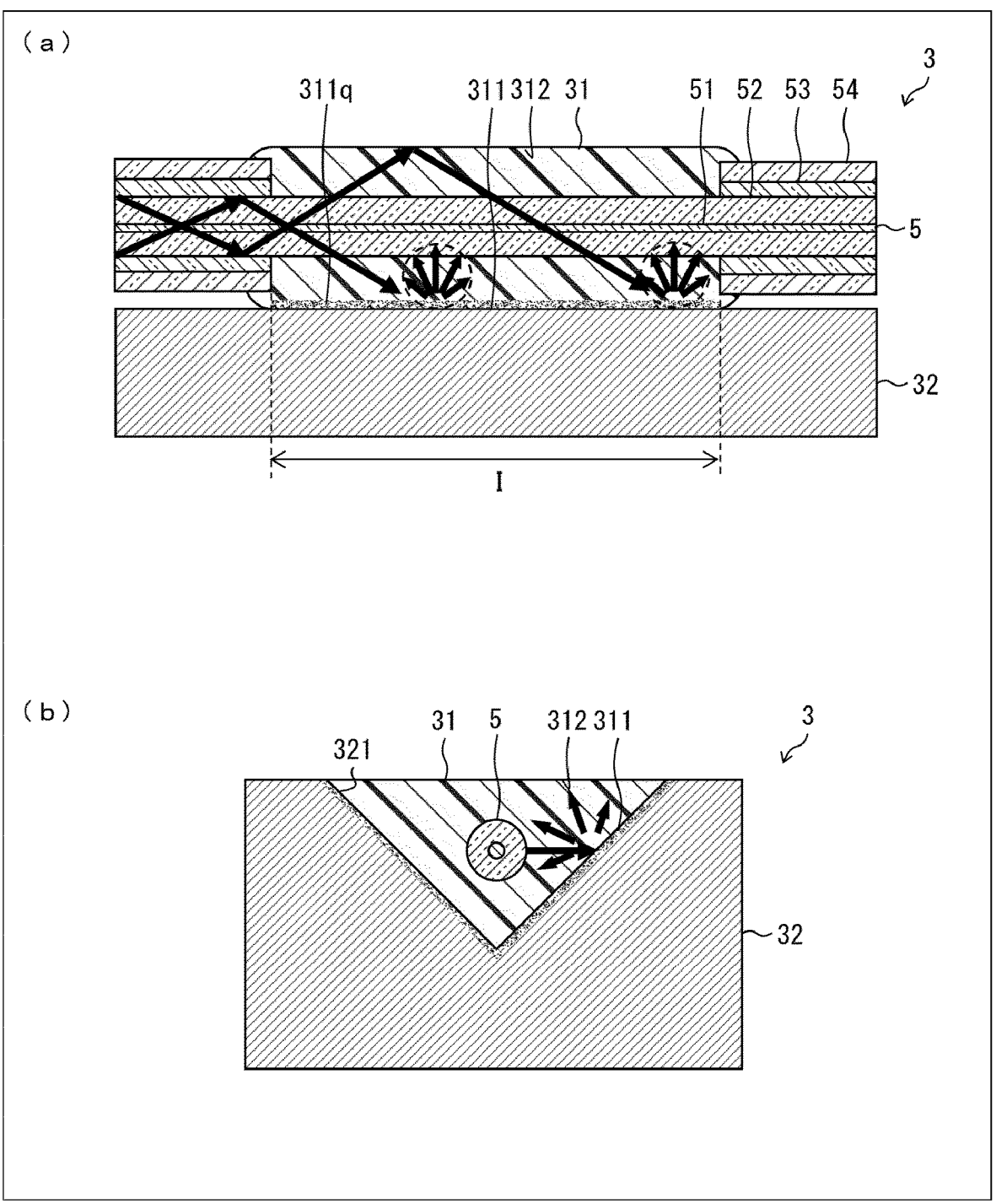
FIG. 5 is a longitudinal sectional view and a transverse sectional view each illustrating a configuration of a cladding mode stripper in accordance with one or more embodiments of the present invention.

The following description will discuss, with reference to FIG. 5, a configuration of a cladding mode stripper 3 in accordance with one or more embodiments of the present invention. (a) of FIG. 5 is a longitudinal sectional view of the cladding mode stripper 3 and (b) of FIG. 5 is a transverse sectional view of the cladding mode stripper 3.

The cladding mode stripper 3 includes (i) the high-refractive-index resin part 31 which covers a coating-removed section I of an optical fiber 5 and (ii) a reinforcement member 32 which supports the high-refractive-index resin part 31. The reinforcement member 32 is, for example, a rectangular parallelepiped member on an upper surface of which a V-shaped groove 321 is formed. The reinforcement member 32 is made of a non-transparent material (e.g., alumina). The high-refractive-index resin part 31 is obtained, for example, by curing resin injected into the V-shaped groove 321 of the reinforcement member 32. The high-refractive-index resin part 31 is made of a light-transmitting resin having a refractive index not less than that of an outermost shell of the optical fiber 5 in the coating-removed section I.

The optical fiber 5 is made of, for example, a core 51 made of glass, an inner cladding 52 made of glass and covering a circumferential surface of the core 51, an outer cladding 53 made of a resin and covering an outer circumferential surface of the inner cladding 52, and a coating 54 made of a resin and covering an outer circumferential surface of the outer cladding 53. In the coating-removed section I, the outer cladding 53 and the coating 54 are removed so that the inner cladding 52 serves as the outermost shell. The high-refractive-index resin part 31 is made of a resin having a refractive index higher than that of the inner cladding 52 and covers the outer circumferential surface of the inner cladding 52 in the coating-removed section I.

The cladding mode stripper 3 is characterized in that the rough surface 311q is formed on a portion of a surface of the high-refractive-index resin part 31 which portion constitutes an interface between the high-refractive-index resin part 31 and the reinforcement member 32, the rough surface 311q having an average roughness (e.g., arithmetic average roughness) Ra greater than $\lambda/2$. Note that $\lambda$ is a wavelength of cladding mode light propagating through the high-refractive-index resin part 31. An average roughness Ra of a region on a surface means a value obtained by averaging, across the region, absolute values of deviations of the surface from an ideal surface. Hereinafter, on the surface of the high-refractive-index resin part 31, a region constituting an interface between the high-refractive-index resin part 31 and the reinforcement member 32 is referred to as a first region 311, and a region constituting an interface between the high-refractive-index resin part 31 and the air is referred to as a second region 312. On the surface of the high-refractive-index resin part 31, a region in which the rough surface 311q is formed is included in the first region 311 and is opposite to the second region 312.

In the high-refractive-index resin part 31, cladding mode light that has entered the high-refractive-index resin part 31 from the optical fiber 5 is scattered, by the first region 311 in which the rough surface 311q is formed as described above, so that an average propagation angle (a mean value of a distribution of propagation angles of scattered light generated when the cladding mode light enters the first region 311) is increased. This is because an intensity distribution of light scattered by the rough surface 311q having an average roughness Ra greater than $\lambda/2$ follows Lambert's law, so that an intensity of light scattered in a direction normal to the rough surface 311q is higher than that of light scattered in a direction other than the direction normal to the rough surface 311q. Here, that "an intensity distribution of light scattered by a surface follows Lambert's law" means that, regardless of an incident angle at which light enters the surface, the relation: $I\varphi = I0 \cdot \cos\varphi$ is satisfied where I0 is an intensity of light scattered in a direction normal to the surface and $I\varphi$ is an intensity of light scattered in a direction that makes an angle of φ with the direction normal to the surface. Particularly in the case of light, such as cladding mode light, which enters the first region 311 at a small incident angle, the effect of increasing the average propagation angle is exhibited to a significant extent. As a result, in the high-refractive-index resin part 31, an average incident angle (a mean value of a distribution of incident angles at which cladding mode light scattered by the first region 311 enters the second region 312) at which cladding mode light scattered by the first region 311 enters the second region 312 is reduced as compared with a case in which the first region 311 does not include a rough surface. That is, the rough surface 311q formed in the first region 311 functions as an incident angle reducing structure for reducing the average incident angle at which the cladding mode light enters the second region 312.

Accordingly, in the high-refractive-index resin part 31, an average reflectance of the second region 312 in reflecting cladding mode light that has been scattered by the first region 311 is reduced as compared with a case in which the first region 311 does not include a rough surface. As a result, an average distance by which cladding mode light propagates inside the high-refractive-index resin part 31 while being repeatedly reflected by the surface of the high-refractive-index resin part 31 is reduced as compared with a case in which the first region 311 does not include a rough surface. This enables effective prevention of heat generation and degradation of the high-refractive-index resin part 31 which are caused by cladding mode light propagating inside the high-refractive-index resin part 31.

Figure 6:
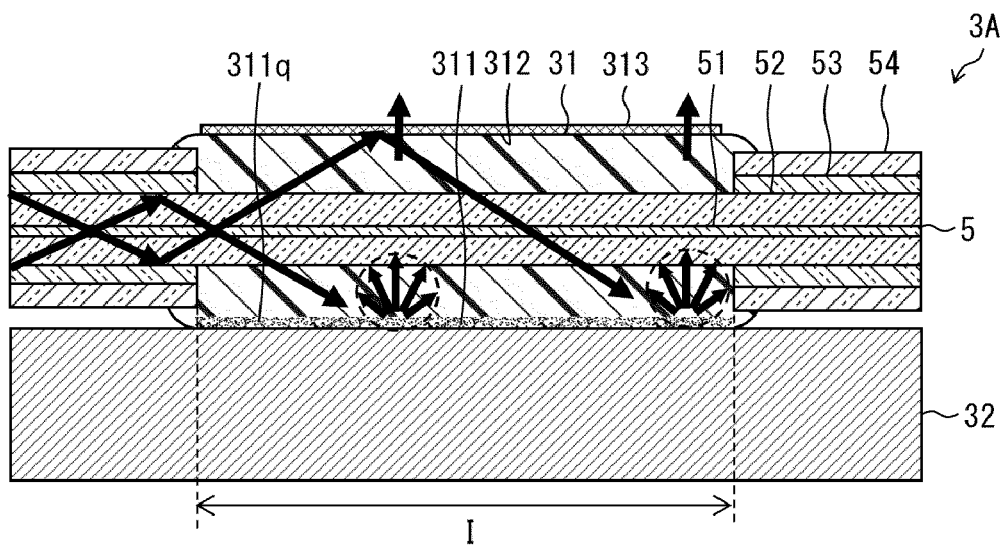
FIG. 6 is a longitudinal sectional view illustrating Modified Example 1 of the cladding mode stripper illustrated in FIG. 5.
Figure 7:
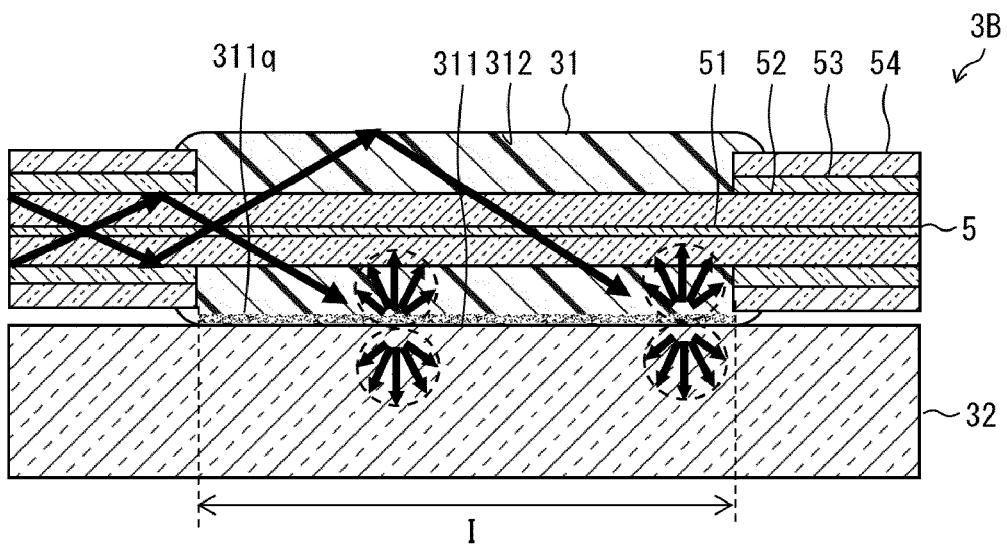
FIG. 7 is a longitudinal sectional view illustrating Modified Example 2 of the cladding mode stripper illustrated in FIG. 5.

The following description will discuss, with reference to FIGS. 6 and 7, Modified Examples of the cladding mode stripper 3 in accordance with one or more embodiments.

A cladding mode stripper 3A in accordance with Modified Example 1 will be described below with reference to FIG. 6. FIG. 6 is a longitudinal sectional view of the cladding mode stripper 3A. The cladding mode stripper 3 (see FIG. 5) and the cladding mode stripper 3A in accordance with Modified Example 3 differ from each other in the following point.

Difference: On the surface of the high-refractive-index resin part 31 of the cladding mode stripper 3, the second region 312 is exposed, whereas on a surface of a high-refractive-index resin part 31 of the cladding mode stripper 3A, a second region 312 is coated with an AR coating 313.

In the high-refractive-index resin part 31 of the cladding mode stripper 3A, the presence of the AR coating with which the second region 312 is coated further reduces a reflectance of the second region 312 in reflecting cladding mode light that has been reflected by the first region 311. Further, since the first region 311 includes a rough surface, an incident angle at which cladding mode light enters the AR coating 313 is reduced, so that an antireflection property of the AR coating 313 is exhibited more easily. As a result, a distance by which cladding mode light propagates inside the high-refractive-index resin part 31 while being repeatedly reflected by the surface of the high-refractive-index resin part 31 is further reduced. This enables even more effective prevention of heat generation and degradation of the high-refractive-index resin part high-refractive-index resin part 31 which are caused by cladding mode light propagating inside the high-refractive-index resin part 31.

Next, a cladding mode stripper 3B in accordance with Modified Example 2 will be described below with reference to FIG. 7. FIG. 7 is a longitudinal sectional view of the cladding mode stripper 3B. The cladding mode stripper 3 (see FIG. 5) and the cladding mode stripper 3B in accordance with Modified Example 2 differ from each other in the following point.

Difference: In the cladding mode stripper 3, the reinforcement member 32 is made of a non-transparent material (e.g., alumina), whereas in the cladding mode stripper 3B, a reinforcement member 32 is made of a transparent material (e.g., quartz or aluminum nitride).

Since the reinforcement member 32 is made of the transparent material, a backward scattering rate (a proportion of cladding mode light that is scattered toward the high-refractive-index resin part 31) of a first region 311 in scattering cladding mode light that has entered a high-refractive-index resin part 31 is reduced. In a case where, as in the first region 311 of Modified Example 2, an interface between the high-refractive-index resin part 31 and the reinforcement member 32 includes a rough surface, the backward scattering rate is typically not more than 50%. Typically, there is a refractive index difference between the reinforcement member 32 and the high-refractive-index resin part 31. Accordingly, in a case where the first region 311 does not include a rough surface, most of cladding mode light entering the first region 311 at a wide incident angle is reflected. For example, in a case where the refractive index difference between the high-refractive-index resin part 31 and the reinforcement member 32 is 4%, the first region 111 has a reflectance of approximately 60% in reflecting cladding mode light that propagates through the high-refractive-index resin part 31 at a propagation angle of 2° and enters the first region 311 at an incident angle of 88°. As the refractive index difference between the high-refractive-index resin part 31 and the reinforcement member 32 increases, a reflectance of the first region 111 in reflecting cladding mode light increases. In the case where the first region 311 includes a rough surface, it is possible, with respect to cladding mode light entering the first region 311 at an incident angle of 88°, to cause an amount of return light which is returned as a result of backward scattering of the cladding mode light toward the high-refractive-index resin part 31 to be reduced to an extent equivalent to or greater than in a case where the refractive index difference between the high-refractive-index resin part 31 and the reinforcement member 32 is reduced to not more than 4%. As a result, an amount of cladding mode light that propagates inside the high-refractive-index resin part 31 while being repeatedly reflected by the surface of the high-refractive-index resin part 31 is further reduced. This enables even more effective prevention of heat generation and degradation of the high-refractive-index resin part 31 which are caused by cladding mode light propagating inside the high-refractive-index resin part 31.

Figure 8:
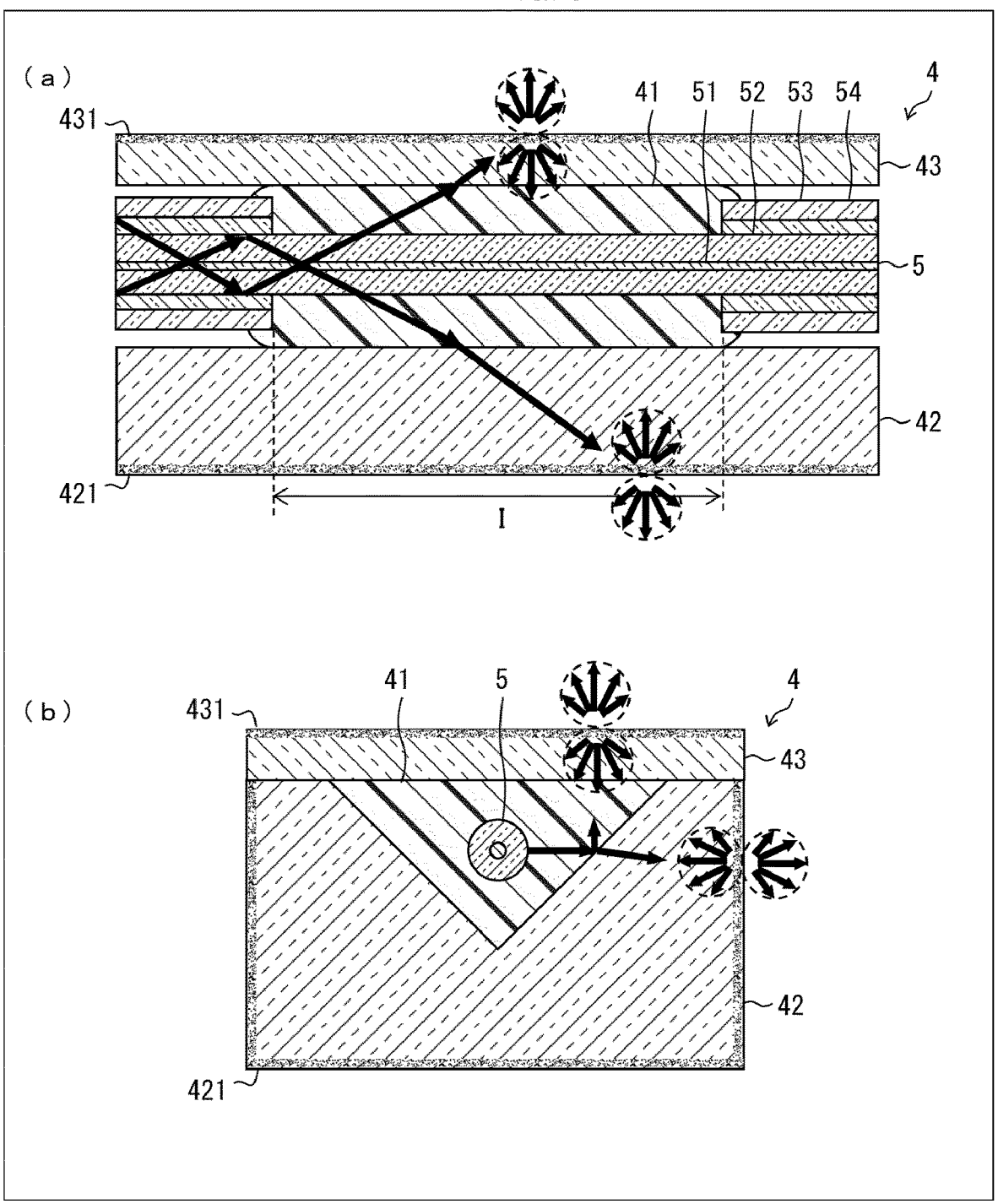
FIG. 8 is a longitudinal sectional view and a transverse sectional view each illustrating a configuration of a cladding mode stripper in accordance with one or more embodiments of the present invention.

The following description will discuss, with reference to FIG. 8, a configuration of a cladding mode stripper 4 in accordance with one or more embodiments of the present invention. (a) of FIG. 8 is a longitudinal sectional view of the cladding mode stripper 4 and (b) of FIG. 8 is a transverse sectional view of the cladding mode stripper 4.

The cladding mode stripper 4 includes (i) a high-refractive-index resin part 41 which covers a coating-removed section I of an optical fiber 5 and (ii) two transparent reinforcement members, namely, transparent reinforcement members 42 to 43, which support the high-refractive-index resin part 41. The first transparent reinforcement member 42 is, for example, a rectangular parallelepiped member on an upper surface of which a V-shaped groove 421 is formed. The first transparent reinforcement member 42 is made of a transparent material (e.g., quartz or the like) having a refractive index matching that of the high-refractive-index resin part 41. The high-refractive-index resin part 41 is obtained, for example, by curing resin injected into the V-shaped groove 421 of the transparent reinforcement member 42. The high-refractive-index resin part 41 is made of a light-transmitting resin having a refractive index not less than that of an outermost shell of the optical fiber 5 in the coating-removed section I. The second transparent reinforcement member 43 is, for example, a rectangular parallelepiped member. The second transparent reinforcement member 43 is made of a transparent material (e.g., quartz or the like) having a refractive index matching that of the high-refractive-index resin part 41. The second transparent reinforcement member 43 is bonded to the first transparent reinforcement member 42 so that a bottom surface of the second transparent reinforcement member 43 is in contact with an upper surface of the first transparent reinforcement member 42. The second transparent reinforcement member 43 serves as a lid for sealing the V-shaped groove 421 formed on the upper surface of the first transparent reinforcement member 42.

The optical fiber 5 is made of, for example, a core 51 made of glass, an inner cladding 52 made of glass and covering a circumferential surface of the core 51, an outer cladding 53 made of a resin and covering an outer circumferential surface of the inner cladding 52, and a coating 54 made of a resin and covering an outer circumferential surface of the outer cladding 53. In the coating-removed section I, the outer cladding 53 and the coating 54 are removed so that the inner cladding 52 serves as the outermost shell. The high-refractive-index resin part 41 is made of a resin having a refractive index higher than that of the inner cladding 52 and covers the outer circumferential surface of the inner cladding 52 in the coating-removed section I.

A first feature of the cladding mode stripper 4 is that the refractive index of the first transparent reinforcement member 42 and the refractive index of the second transparent reinforcement member 43 each match the refractive index of the high-refractive-index resin part 41. Accordingly, most of cladding mode light that has entered the high-refractive-index resin part 41 from the optical fiber 5 either (i) passes through an interface between the high-refractive-index resin part 41 and the first transparent reinforcement member 42 so as to enter the first transparent reinforcement member 42 or (ii) passes through an interface between the high-refractive-index resin part 41 and the second transparent reinforcement member 43 so as to enter the second transparent reinforcement member 43. For example, in a case where a refractive index difference between the high-refractive-index resin part 41 and the first transparent reinforcement member 42 and a refractive index difference between the high-refractive-index resin part 41 and the second transparent reinforcement member 43 are each not more than 2%, a half or more of cladding mode light that propagates through the high-refractive-index resin part 41 at a propagation angle of 2° and enters the transparent reinforcement member 43 at an incident angle of 88° either (i) passes through the interface between the high-refractive-index resin part 41 and the first transparent reinforcement member 42 so as to enter the first transparent reinforcement member 42 or (ii) passes through the interface between the high-refractive-index resin part 41 and the second transparent reinforcement member 43 so as to enter the second transparent reinforcement member 43. Accordingly, a distance by which cladding mode light propagates inside the high-refractive-index resin part 41 while being repeatedly reflected by the interface between the high-refractive-index resin part 41 and the first transparent reinforcement member 42 and the interface between the high-refractive-index resin part 41 and the second transparent reinforcement member 43 is reduced as compared with a case in which neither of the refractive indices of the first transparent reinforcement member 42 and the second transparent reinforcement member 43 does not match the refractive index of the high-refractive-index resin part 41. This enables effective prevention of heat generation and degradation of the high-refractive-index resin part 41 which are caused by cladding mode light propagating inside the high-refractive-index resin part 41.

A second feature of the cladding mode stripper 4 is that a region 421 of a surface of the first transparent reinforcement member 42 which region 421 is opposite to the interface between the first transparent reinforcement member 42 and the high-refractive-index resin part 41 includes a rough surface, and a region 431 of a surface of the second transparent reinforcement member 43 which region 431 is opposite to the interface between the second transparent reinforcement member 43 and the high-refractive-index resin part 41 includes a rough surface. Accordingly, most of cladding mode light that has entered the first transparent reinforcement member 42 and the second transparent reinforcement member 43 by passing through the interface between the first transparent reinforcement member 42 and the high-refractive-index resin part 41 and the interface between the second transparent reinforcement member 43 and the high-refractive-index resin part 41 is scattered in the region 421 of the transparent reinforcement member 42 and the region 431 of the second transparent reinforcement member 43. That is, most of cladding mode light that has entered the first transparent reinforcement member 42 and the second transparent reinforcement member 43 by passing through the interface between the first transparent reinforcement member 42 and the high-refractive-index resin part 41 and the interface between the second transparent reinforcement member 43 and the high-refractive-index resin part 41 is prevented from reentering the high-refractive-index resin part 41 and is emitted to an outside of the cladding mode stripper 4. Further, as for light that has reentered the high-refractive-index resin part 41 as a result of backward scattering, an average of a propagation angle of the light is increased due to the scattering. This reduces a distance by which the light propagates inside the high-refractive-index resin part 41 while being repeatedly reflected by the interfaces of the high-refractive-index resin part 41. In a case where the interfaces in the regions 421 and 431 do not include a rough surface, there is a significantly big refractive index difference between the air and each of the transparent reinforcement members 42 and 43. This causes most of light having a small propagation angle as with cladding mode light to be specularly reflected and reenter the high-refractive-index resin part 41 while having the small propagation angle.

The following description will discuss, with reference to FIGS. 9 through 12, Modified Examples of the cladding mode stripper 4 in accordance with one or more embodiments.

Figure 9:
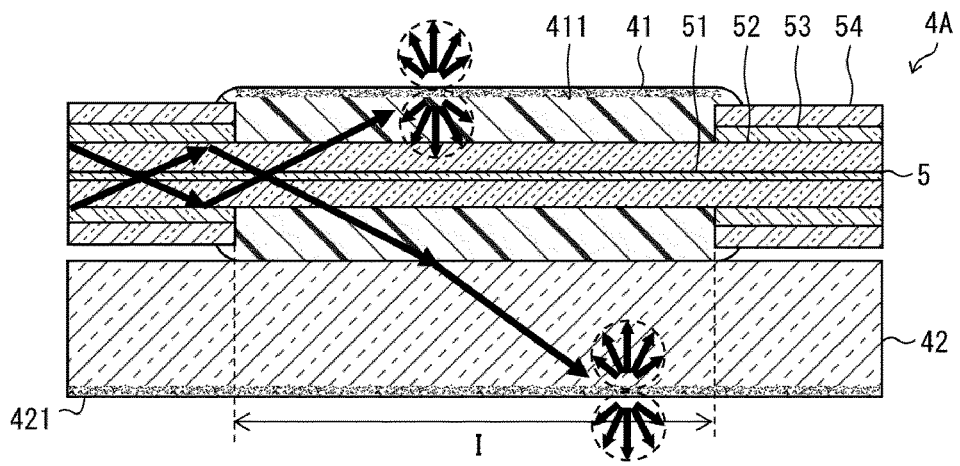
FIG. 9 is a longitudinal sectional view illustrating Modified Example 1 of the cladding mode stripper illustrated in FIG. 8.

A cladding mode stripper 4A in accordance with Modified Example 1 will be described below with reference to FIG. 9. FIG. 9 is a longitudinal sectional view of the cladding mode stripper 4A.

The cladding mode stripper 4A is identical to the cladding mode stripper 4 (see FIG. 8) except that (i) the cladding mode stripper 4A has no second transparent reinforcement member 43 and (ii) a region 411 on a surface of a highrefractive-index resin part 41, which region 411 is opposite to an interface between the high-refractive-index resin part 41 and a first transparent reinforcement member 42, includes a rough surface. Most of cladding mode light that has entered is scattered in the region 411. That is, most of cladding mode light that has entered the region 411, which is an interface between the high-refractive-index resin part 41 and the air, is prevented from reentering the high-refractive-index resin part 41 and is emitted to an outside of the cladding mode stripper 4. The rough surface formed in the region 411 functions as an incident angle reducing structure for reducing an average incident angle at which cladding mode light enters the interface between the high-refractive-index resin part 41 and the transparent reinforcement member 42 and enters a region 421 which is opposite to the region 411.

Accordingly, most of cladding mode light that has entered the transparent reinforcement member 42 from the high-refractive-index resin part 41 passes through the region 421 instead of being reflected. Further, the first region 421 also includes a rough surface, so that a component having a wide incident angle among the cladding mode light is also scattered instead of being reflected. As a result, a distance by which cladding mode light propagates inside the high-refractive-index resin part 41 while being repeatedly reflected by the surface of the high-refractive-index resin part 41 is further reduced. This enables even more effective prevention of heat generation and degradation of the high-refractive-index resin part 41 which are caused by cladding mode light propagating inside the high-refractive-index resin part 41.

Figure 10:
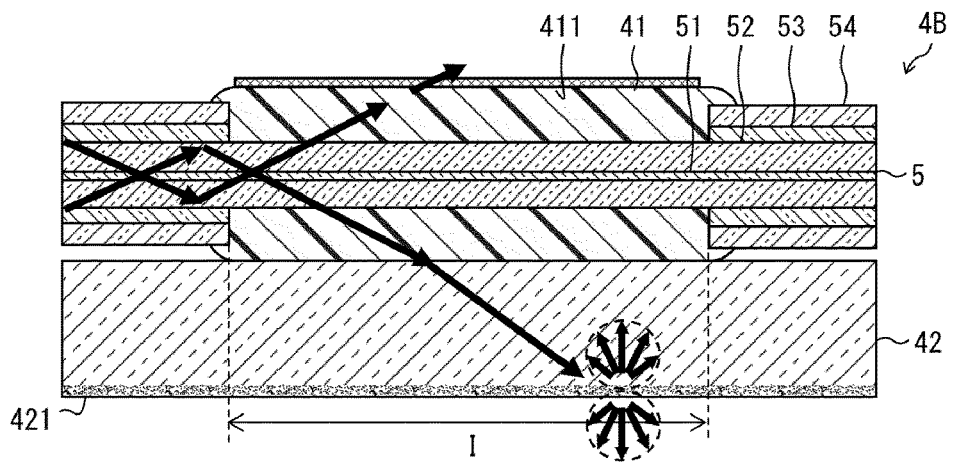
FIG. 10 is a longitudinal sectional view illustrating Modified Example 2 of the cladding mode stripper illustrated in FIG. 8.

Next, a cladding mode stripper 4B in accordance with Modified Example 2 will be described below with reference to FIG. 10. FIG. 10 is a longitudinal sectional view of the cladding mode stripper 4B.

The cladding mode stripper 4B is identical to the cladding mode stripper 4 (see FIG. 8) except that (i) the cladding mode stripper 4B has no second transparent reinforcement member 43 and (ii) a region 411 on a surface of a high-refractive-index resin part 41, which region 411 is opposite to an interface between the high-refractive-index resin part 41 and a first transparent reinforcement member 42, is coated with an AR coating.

Accordingly, most of cladding mode light that has entered the region 411 of the high-refractive-index resin part 41 is allowed to pass through instead of being reflected. Further, the region 421 has a light scattering surface, so that an incident angle at which cladding mode light enters the AR coating is reduced. This allows an antireflection property of the AR coating to be exhibited more easily. As a result, a distance by which cladding mode light propagates inside the high-refractive-index resin part 41 while being repeatedly reflected by the surface of the high-refractive-index resin part 41 is further reduced. This enables even more effective prevention of heat generation and degradation of the high-refractive-index resin part 41 which are caused by cladding mode light propagating inside the high-refractive-index resin part 41.

Figure 11:
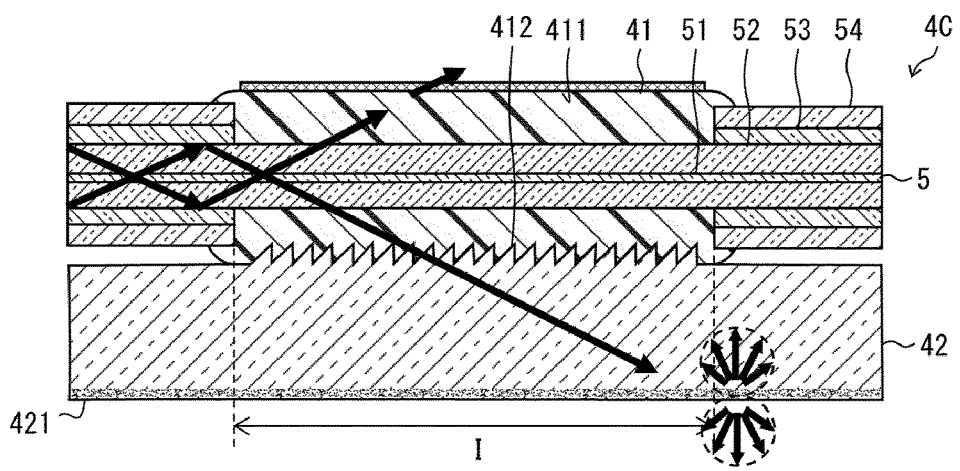
FIG. 11 is a longitudinal sectional view illustrating Modified Example 3 of the cladding mode stripper illustrated in FIG. 8.

Next, a cladding mode stripper 4C in accordance with Modified Example 3 will be described below with reference to FIG. 11. FIG. 11 is a longitudinal sectional view of the cladding mode stripper 4C.

The cladding mode stripper 4C is identical to the cladding mode stripper 4B (see FIG. 10) except that a planar prism is formed in a region 412 on a surface of a high-refractive-index resin part 41, which region 412 constitutes an interface between the high-refractive-index resin part 41 and a transparent reinforcement member 42. The planar prism formed in the region 412 functions as an incident angle reducing structure for reducing an average incident angle at which cladding mode light enters the region 412.

Accordingly, a reflectance of the high-refractive-index resin part 41 in reflecting cladding mode light entering the interface between the high-refractive-index resin part 41 and the transparent reinforcement member 42 is reduced. Further, a propagation angle of cladding mode light reflected by the region 412 is increased. As a result, a distance by which cladding mode light propagates inside the high-refractive-index resin part 41 while being repeatedly reflected by the surface of the high-refractive-index resin part 41 is further reduced. This enables even more effective prevention of heat generation and degradation of the high-refractive-index resin part 41 which are caused by cladding mode light propagating inside the high-refractive-index resin part 41.

Figure 12:
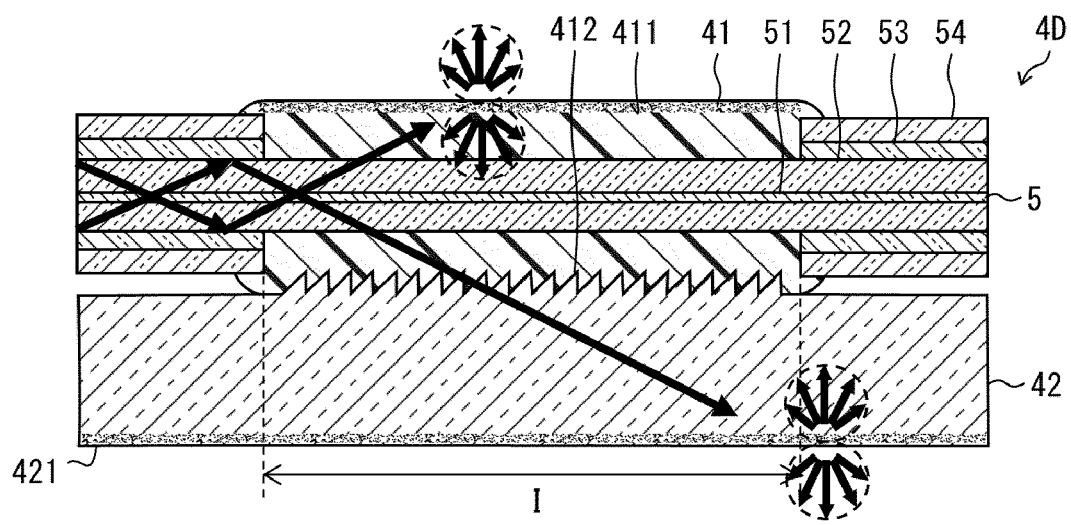
FIG. 12 is a longitudinal sectional view illustrating Modified Example 4 of the cladding mode stripper illustrated in FIG. 8.
Figure 13:
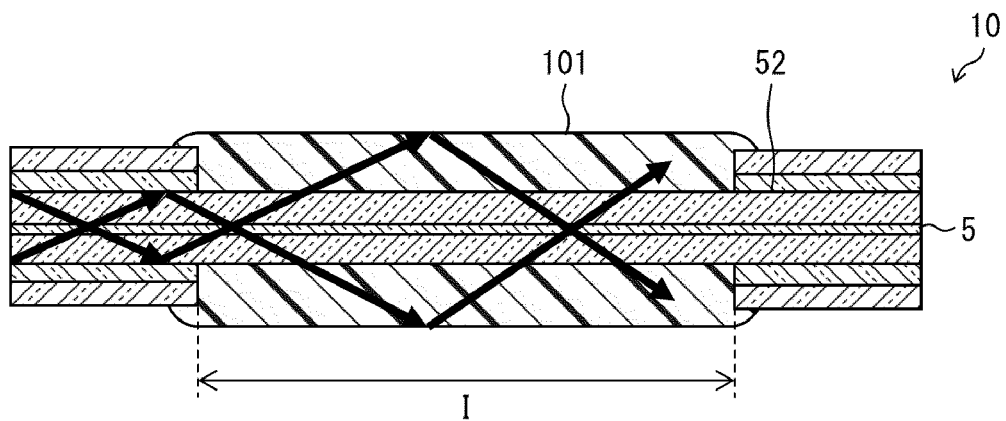
FIG. 13 is a longitudinal sectional view illustrating a configuration of a conventional cladding mode stripper.

Next, a cladding mode stripper 4D in accordance with Modified Example 4 will be described below with reference to FIG. 12. FIG. 12 is a longitudinal sectional view of the cladding mode stripper 4D.

The cladding mode stripper 4D is identical to the cladding mode stripper 4A (see FIG. 9) except that a planar prism is formed in a region 412 on a surface of a high-refractive-index resin part 41, which region 412 constitutes an interface between the high-refractive-index resin part 41 and a transparent reinforcement member 42. The planar prism formed in the region 412 functions as an incident angle reducing structure for reducing an average incident angle at which cladding mode light enters the region 412.

Accordingly, a reflectance of the high-refractive-index resin part 41 in reflecting cladding mode light entering an interface between the high-refractive-index resin part 41 and the transparent reinforcement member 42 is reduced. Further, a propagation angle of cladding mode light reflected by the region 412 is increased. As a result, a distance by which cladding mode light propagates inside the high-refractive-index resin part 41 while being repeatedly reflected by the surface of the high-refractive-index resin part 41 is further reduced. This enables even more effective prevention of heat generation and degradation of the high-refractive-index resin part 41 which are caused by cladding mode light propagating inside the high-refractive-index resin part 41.

Aspects of the present invention can also be expressed as follows:

A cladding mode stripper in accordance with one or more embodiments of the present invention is a cladding mode stripper, including a resin part which covers a coating-removed section of an optical fiber and has a refractive index not less than that of an outermost shell of the optical fiber in the coating-removed section, the resin part including an incident angle reducing structure formed on a surface of the resin part which surface is opposite to an interface between the resin part and the outermost shell, the incident angle reducing structure being for reducing an incident angle or an average incident angle at which cladding mode light that has entered the resin part from the optical fiber enters the surface.

The cladding mode stripper in accordance with one or more embodiments of the present invention may be arranged such that the incident angle reducing structure is a rough surface which reduces an average incident angle at which the cladding mode light scattered by the incident angle reducing structure enters a region of the surface which region is opposite to the incident angle reducing structure.

The cladding mode stripper in accordance with one or more embodiments of the present invention may be arranged such that the rough surface scatters the cladding mode light so as to increase an average propagation angle of the cladding mode light.

The cladding mode stripper in accordance with one or more embodiments of the present invention may be arranged such that an average roughness Ra of the rough surface is greater than $\lambda/2$ where $\lambda$ is a wavelength of the cladding mode light propagating through the resin part.

The cladding mode stripper in accordance with one or more embodiments of the present invention may be arranged such that the incident angle reducing structure is a planar prism which reduces an incident angle at which the cladding mode light reflected by the incident angle reducing structure enters a region of the surface which region is opposite to the incident angle reducing structure.

The cladding mode stripper in accordance with one or more embodiments of the present invention may be arranged such that the planar prism reflects the cladding mode light so as to increase a propagation angle of the cladding mode light.

The cladding mode stripper in accordance with one or more embodiments of the present invention may be arranged such that the incident angle reducing structure is a planar prism which reduces an incident angle at which the cladding mode light enters the incident angle reducing structure.

The cladding mode stripper in accordance with one or more embodiments of the present invention may be arranged such that the cladding mode stripper further includes a transparent member which supports the resin part and has a refractive index matching that of the resin part, the transparent member including a rough surface formed in a region of a surface of the transparent member which region is opposite to an interface between the transparent member and the resin part, cladding mode light that has entered the transparent member from the optical fiber through the resin part being scattered by the rough surface so that an average propagation angle of the cladding mode light is increased.

The cladding mode stripper in accordance with one or more embodiments of the present invention may be arranged such that an average roughness Ra of the rough surface is greater than $\lambda/2$ where $\lambda$ is a wavelength of the cladding mode light propagating through the transparent member.

The cladding mode stripper in accordance with one or more embodiments of the present invention may be arranged such that a refractive index difference between the resin part and the transparent member is not more than 2%.

The cladding mode stripper in accordance with one or more embodiments of the present invention may be arranged such that the region of the surface of the resin part which region is opposite to the interface between the resin part and the transparent member includes a rough surface or is coated with an AR coating.

A cladding mode stripper in accordance with one or more embodiments of the present invention is a cladding mode stripper, including: a resin part which covers a coating-removed section of an optical fiber and has a refractive index not less than that of an outermost shell of the optical fiber in the coating-removed section; and a transparent member which supports the resin part and has a refractive index matching that of the resin part, the transparent member including a rough surface in a region of a surface of the transparent member which region is opposite to an interface between the transparent member and the resin part, cladding mode light that has entered the transparent member from the optical fiber through the resin part being scattered by the rough surface so that an average propagation angle of the cladding mode light is increased.

The cladding mode stripper in accordance with one or more embodiments of the present invention may be arranged such that an average roughness Ra of the rough surface is greater than $\lambda/2$ where $\lambda$ is a wavelength of the cladding mode light propagating through the transparent member.

The cladding mode stripper in accordance with one or more embodiments of the present invention may be arranged such that a refractive index difference between the resin part and the transparent member is not more than 2%.

The cladding mode stripper in accordance with one or more embodiments of the present invention may be arranged such that a region of a surface of the resin part which region is opposite to the interface between the resin part and the transparent member includes a rough surface or is coated with an AR coating.

Supplementary Note

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1, 1A, 1B cladding mode stripper
11 high-refractive-index resin part
12 reinforcement member
2 cladding mode stripper
21 high-refractive-index resin part
22 reinforcement member
3, 3A, 3B cladding mode stripper
31 high-refractive-index resin part
32 reinforcement member
4, 4A, 4B, 4C cladding mode stripper
41 high-refractive-index resin part
42, 43 transparent reinforcement member
5 optical fiber

The invention claimed is:

1. A cladding mode stripper, comprising:
a resin part that covers a coating-removed section of an optical fiber and has a refractive index not less than that of an outermost shell of the optical fiber in the coating-removed section; and
a reinforcement member that supports the resin part and is made of non-transparent material, wherein
a surface of the resin part comprises an incident angle reducing structure,
the surface is opposite to an interface between the resin part and the outermost shell,
the incident angle reducing structure reduces a first incident angle or a first average incident angle at which cladding mode light that has entered the resin part from the optical fiber enters the surface, and
the reinforcement member is separated from the outermost shell and in direct contact with the resin part.

2. The cladding mode stripper according to claim 1, wherein
the incident angle reducing structure is a rough surface that reduces a second average incident angle at which the cladding mode light scattered by the incident angle reducing structure enters a region of the surface, and
the region is opposite to the incident angle reducing structure.

3. The cladding mode stripper according to claim 2, wherein the rough surface scatters the cladding mode light and increases an average propagation angle of the cladding mode light.

4. The cladding mode stripper according to claim 2, wherein an average roughness of the rough surface is greater than $\lambda/2$ where $\lambda$ is a wavelength of the cladding mode light propagating through the resin part.

5. The cladding mode stripper according to claim 1, wherein
the incident angle reducing structure is a planar prism that reduces a second incident angle at which the cladding mode light reflected by the incident angle reducing structure enters a region of the surface, and
the region is opposite to the incident angle reducing structure.

6. The cladding mode stripper according to claim 5, wherein the planar prism reflects the cladding mode light and increases a propagation angle of the cladding mode light.

7. The cladding mode stripper according to claim 1, wherein the incident angle reducing structure is a planar prism that reduces a second incident angle at which the cladding mode light enters the incident angle reducing structure.

8. A cladding mode stripper, comprising:
a resin part that covers a coating-removed section of an optical fiber and has a refractive index not less than that of an outermost shell of the optical fiber in the coating-removed section; and
reinforcement member that supports the resin part and has a refractive index matching that of the resin part, wherein
a region of a surface of the reinforcement member comprises a rough surface,
the region is opposite to an interface between the reinforcement member and the resin part,
the reinforcement member is transparent and is disposed between the region and the interface, and
cladding mode light that has entered the reinforcement member from the optical fiber through the resin part is scattered by the rough surface such that an average propagation angle of the cladding mode light is increased.

9. The cladding mode stripper according to claim 8, wherein an average roughness of the rough surface is greater than $\lambda/2$ where $\lambda$ is a wavelength of the cladding mode light propagating through the transparent reinforcement member.

10. The cladding mode stripper according to claim 8, wherein a refractive index difference between the resin part and the reinforcement member is not more than 2%.

11. The cladding mode stripper according to claim 8, wherein
a region of a surface of the resin part comprises a rough surface or is coated with an AR coating, and
the region of the surface of the resin part is opposite to the interface between the resin part and the reinforcement member.

12. The cladding mode stripper according to claim 8, wherein
a surface of the resin part comprises an incident angle reducing structure,
the surface is opposite to an interface between the resin part and the outermost shell, and
the incident angle reducing structure reduces an incident angle or an average incident angle at which cladding mode light that has entered the resin part from the optical fiber enters the surface.

* * * * *